United States Patent
Bonin et al.

(10) Patent No.: US 8,547,047 B2
(45) Date of Patent: Oct. 1, 2013

(54) METHOD AND DEVICE FOR MONITORING A MOVEMENT-CONTROLLED MACHINE WITH AN ELECTRONICALLY COMMUTATED DRIVE MOTOR

(75) Inventors: Uwe Bonin, Friedberg (DE); Josef Hofmann, Wolferstadt (DE)

(73) Assignee: Kuka Laboratories GmbH, Augsburg (DE)

( * ) Notice: Subject to any disclaimer, the term of this patent is extended or adjusted under 35 U.S.C. 154(b) by 166 days.

(21) Appl. No.: 13/162,827

(22) Filed: Jun. 17, 2011

(65) Prior Publication Data

US 2011/0309782 A1  Dec. 22, 2011

(30) Foreign Application Priority Data

Jun. 18, 2010 (DE) .................. 10 2010 024 238

(51) Int. Cl.
G05B 5/01 (2006.01)
(52) U.S. Cl.
USPC ........... 318/611; 318/570; 318/600; 318/569; 318/560
(58) Field of Classification Search
USPC .......... 318/611, 560, 568.11, 568.12, 568.15, 318/568.16, 400.01, 700, 570, 569, 600; 700/245, 254
See application file for complete search history.

(56) References Cited

U.S. PATENT DOCUMENTS

| | | | | |
|---|---|---|---|---|
| 4,074,179 A * | 2/1978 | Kuo et al. | | 318/696 |
| 4,992,710 A * | 2/1991 | Cassat | | 318/400.33 |
| 5,200,683 A * | 4/1993 | Taylor et al. | | 318/661 |
| 5,428,285 A * | 6/1995 | Koyama et al. | | 318/799 |
| 5,475,291 A * | 12/1995 | Yoshida et al. | | 318/568.22 |
| 5,682,089 A * | 10/1997 | Bolte et al. | | 318/400.09 |
| 6,140,789 A * | 10/2000 | Kachi et al. | | 318/603 |
| 6,172,498 B1 * | 1/2001 | Schmidt et al. | | 324/207.12 |
| 6,232,737 B1 * | 5/2001 | Kachi et al. | | 318/610 |
| 6,505,096 B2 * | 1/2003 | Takenaka et al. | | 700/245 |
| 6,563,283 B2 * | 5/2003 | Iwashita et al. | | 318/599 |
| 6,603,279 B2 | 8/2003 | Moddemann | | |
| 7,102,315 B2 * | 9/2006 | Nakata et al. | | 318/568.22 |
| 7,141,952 B2 | 11/2006 | Blödow | | |
| 7,299,708 B2 * | 11/2007 | Ho | | 73/862.193 |
| 7,315,142 B2 | 1/2008 | Lindemann et al. | | |
| 7,388,367 B2 * | 6/2008 | Stauder et al. | | 324/207.25 |
| 7,528,565 B2 * | 5/2009 | Fujita et al. | | 318/560 |
| 7,750,585 B2 | 7/2010 | Schwarzkopf | | |
| 8,324,851 B2 * | 12/2012 | Matsuo et al. | | 318/400.33 |
| 2010/0259206 A1 | 10/2010 | Joachimsmeyer | | |

FOREIGN PATENT DOCUMENTS

DE 10 2004 019 284 A1 10/2005
DE 10 2007 017 285 A1 6/2008

* cited by examiner

Primary Examiner — Rita Leykin
(74) Attorney, Agent, or Firm — Schiff Hardin LLP

(57) ABSTRACT

In a method and device for monitoring a movement-controlled machine, such as a manipulator, having an electronically commutated drive motor for which a commutation angle is provided based on its detected real position and a control variable, in particular a predetermined desired position, a limit value is determined for a rate of change in particular a time derivative of the real position of the drive motor, and the commutation angle is predetermined such that the rate of change of the commutation angle does not exceed a limit value.

13 Claims, 1 Drawing Sheet

METHOD AND DEVICE FOR MONITORING A MOVEMENT-CONTROLLED MACHINE WITH AN ELECTRONICALLY COMMUTATED DRIVE MOTOR

BACKGROUND OF THE INVENTION

1. Field of the Invention

The present invention concerns a method and device for monitoring a movement-controlled machine, such as a robot, with an electronically commutated drive motor whose real position is detected, and for which a commutation angle is predetermined based on its real position and a control variable, in particular a predetermined desired position.

2. Description of the Prior Art

Machine with a movement control (i.e. a movement predetermined by a controller), such as single- or multi-axis robots, frequently have one or more servo drives (servo actuators) that act on the respective movement axes.

Such servo drives include an electronically commutated electromotor, for example a permanently activated synchronous motor, and a convertor to generate a rotating stator field that follows the permanently activated rotor and thus delivers a desired torque or a desired axle position. For this purpose, the commutation angle is predetermined that sets the orientation of the rotating stator field. It depends on, among other things, the real position of the rotor (i.e. its orientation), that can be detected, for example using Hall sensors or the induction in currentless stator windings. Activations of electronically commutating electromotors with a specification of an angle for the stator field are known from EP 1 734 648 A1, DE 103 30 551 B4 and DE 10 2007 040 560 A1, for example.

The servo-electronics that implement this operation and feeds the stator windings with current in the required manner is activated by a superordinate (i.e., higher in a hierarchical control architecture machine controller that predetermines a control variable for the drive motor on the basis of the movement control for the machine. For example, a robot controller can predetermine synchronized, new desired angle positions for the drive motors in order to achieve programmed desired poses.

Particularly in the case of manipulators (such as industrial robots, for instance) it should be ensured that predetermined velocity limits of individual axes or a reference point, such as the TCP ("Tool Center Point"), are not exceeded. Today this is ensured by appropriate velocity monitors in the robot controller, that detect real positions or real velocities, and compare these with predetermined velocity limits (possibly after corresponding time difference calculation) and triggers error reactions (for instance safely halts the robot) if the limits are exceeded.

This monitoring in the superordinate controller causes accumulating reaction times between exceeding a velocity limit and the corresponding reaction, such that an unwanted coasting of the robot occurs that must be accounted for with, for example, appropriately enlarged protective areas (i.e. areas free of objects and personnel)

SUMMARY OF THE INVENTION

An object of the present invention is to provide an improved monitoring of a movement-controlled machine, for example, a manipulator (in particular a robot).

According to the invention use is made of the fact is utilized that, for an electronically commutated drive motor, the drive force that it produces as an output depends on (among other things) the predetermined commutation angle.

If the commutation angle is predetermined such that the rate of change of the commutation angle does not exceed a limit value, the drive force of the drive motor that actuates the machine is thus reduced automatically upon exceeding this limit value, possibly to zero or even beyond this to a resetting braking force. Moreover, this additionally take place more quickly in a drive controller than in a superordinate machine controller, so that unwanted reaction delays or, respectively, slow-down paths can advantageously be reduced.

The drive motor can provide the full drive force (for example a desired motor moment) as long as the rate of change does not exceed the limit value. This is advantageous particularly for robot manipulations in tightly restricted, sensitive work spaces, as occur in (for example) medical robots, in particular surgical robots.

For example, a commanded overrun (performed by the drive motors) of a velocity limit value or acceleration limit value can be prevented by appropriate specification of a limit value for the commutation angle velocity or commutation angle acceleration while the full drive forces are provided within the permitted limit values.

According to a preferred embodiment of the present invention, to control movement of a machine, in particular a single-axis or multi-axis manipulator such as a robot, a superordinate machine controller provides control variables for its drive motor. Regulation, i.e. the generation and emission of correcting variables on the basis of predetermined desired variables and detected real variables, is encompassed herein within the general concept of attitudes (positions) control.

For example, a robot controller can determine new synchronized desired attitudes (positions) of the robot from a previously taught path and define corresponding desired positions, for instance desired rotation angles of the joints of an articulated arm robot or desired positions of linear motors of a portal robot. A force regulation (for example a model-based force regulation) can similarly provide desired drive forces, wherein for a more compact presentation an anti-parallel force pair (i.e. a torque) is generally designated as a force. Correcting or control variables can be provided as a difference relative to a real value, for example.

In a preferred embodiment, a motor controller provides a rotor field, for example desired values for the current component Id ("direct", i.e. in the direction of the rotor magnetic field) and $I_q$ ("quadrature", i.e. perpendicular to this), in field coordinates of the rotor of the drive motor, based on predetermined control variables and a detected real position for a drive motor.

In order to produce this result, a current controller can predetermine a stator field, for example desired values for the current components $I_a$, $I_b$ in (possibly virtual) windings of a stator. This can be achieved by a convertor, in particular modulated by pulse width.

The angle of the orientation of such a stator field relative to an inertial (for example fixed relative to the stator) reference system is designated as a commutation angle.

In a preferred embodiment as a permanently activated synchronous machine, the permanently activated rotor runs with the rotating stator field revolving with this commutation angle so that, by a limitation of the rate of change of the commutation angle according to the invention as explained above, the actuated movement (driven by the drive motor) can be limited to a predetermined rate of change above which the drive motor acts to accelerate only at a lower rate, advantageously to accelerate not at all, and particularly preferably even acts as a brake.

According to the invention, for monitoring (for example in advance of or during the operation by the machine controller), a fixed or variable limit value is predetermined for a rate of change of the real position of the drive motor. Such a rate of change can in particular be a change of the real position over time (i.e. the velocity) and/or a time derivative of this (for example the acceleration). For example, this can be achieved by reverse transformation on a joint angle plane from a predetermined Cartesian maximum velocity of the TCP, or even by direct specification of drive motor velocities, accelerations, jerks and the like.

A limit value for a corresponding rate of change of the commutation angle can be determined from this limit value for the rate of change of the real position of the drive motor, for example again in advance or during the operation. For example, this can be proportional to the rate of change limit value for the real position of the drive motor. A proportionality factor can be the number of pole pairs of the drive motor, or use this as a multiplication factor.

According to the invention, the commutation angle is predetermined such that the rate of change limit value (for example, predetermined as explained above) will not be exceeded. In particular, a limit value for the commutation angle velocity with which the stator rotation field rotates, the commutation angle acceleration, the commutation angle jerk, and/or higher time derivatives, can be predetermined.

In a preferred embodiment, the control commutation angle or the control commutation angle change is determined based on the detected real drive motor position and the predetermined control variable such that the predetermined control variable is reached. For example, the associated commutation angle or the associated commutation angle change can be determined given a commanded new desired drive motor angle position or a commanded desired drive motor angle change with predetermined desired drive motor force.

In the preferred embodiment, this control commutation angle is only predetermined as a commutation angle to be realized as a drive motor or this is predetermined based on the control commutation angle change when the change relative to the current real commutation angle does not exceed the limit value for the rate of change.

In contrast, if the change or rate of change exceeds the limit value given realization of the control commutation angle defined on the basis of the commanded control variable, or realization of the control commutation angle change defined on the basis of the commanded control variable, instead of this a constant commutation angle can be predetermined in a preferred embodiment. This can produce a position-dependent pendulum force between a desired drive force and its negative value.

A commutation angle can similarly be predetermined that is shifted by a predetermined (in particular constant) value relative to the detected real drive motor position. The shift can advantageously be selected such that the drive motor counteracts the movement in a braking manner.

A commutation angle alternatively can be predetermined on the basis of a real commutation angle and a reliable maximum change value for the commutation angle, such that the rate of change of the commutation angle is limited to this maximum change value. This can likewise produce a pendulum force between a desired drive force and its negative value.

In addition to the commutation angle, the desired drive force of the drive motor (corresponding to its torque given a torque motor) can also be predetermined by specifying the amplitude of the current component $I_q$. In a preferred embodiment of the present invention, this amplitude is predetermined as a constant.

DESCRIPTION OF THE PREFERRED EMBODIMENTS

Figure 1:
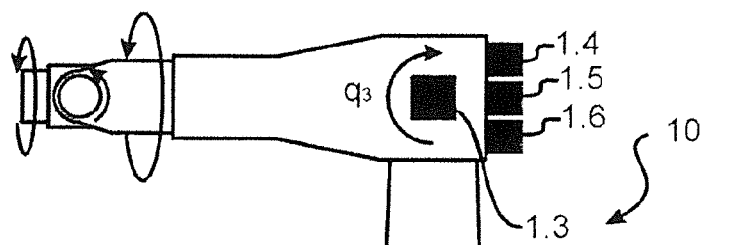
FIG. 1 illustrates an articulated arm robot.

FIG. 1 shows six-axis articulated arm robot 10 with drive motors (symbolized in black) in the form of permanently activated synchronous motors 1.1, . . . , 1.6 that actuate movement axes whose positions $q_1, q_2, \ldots$ determine the overall position (pose) of the robot 10.

Figure 2:
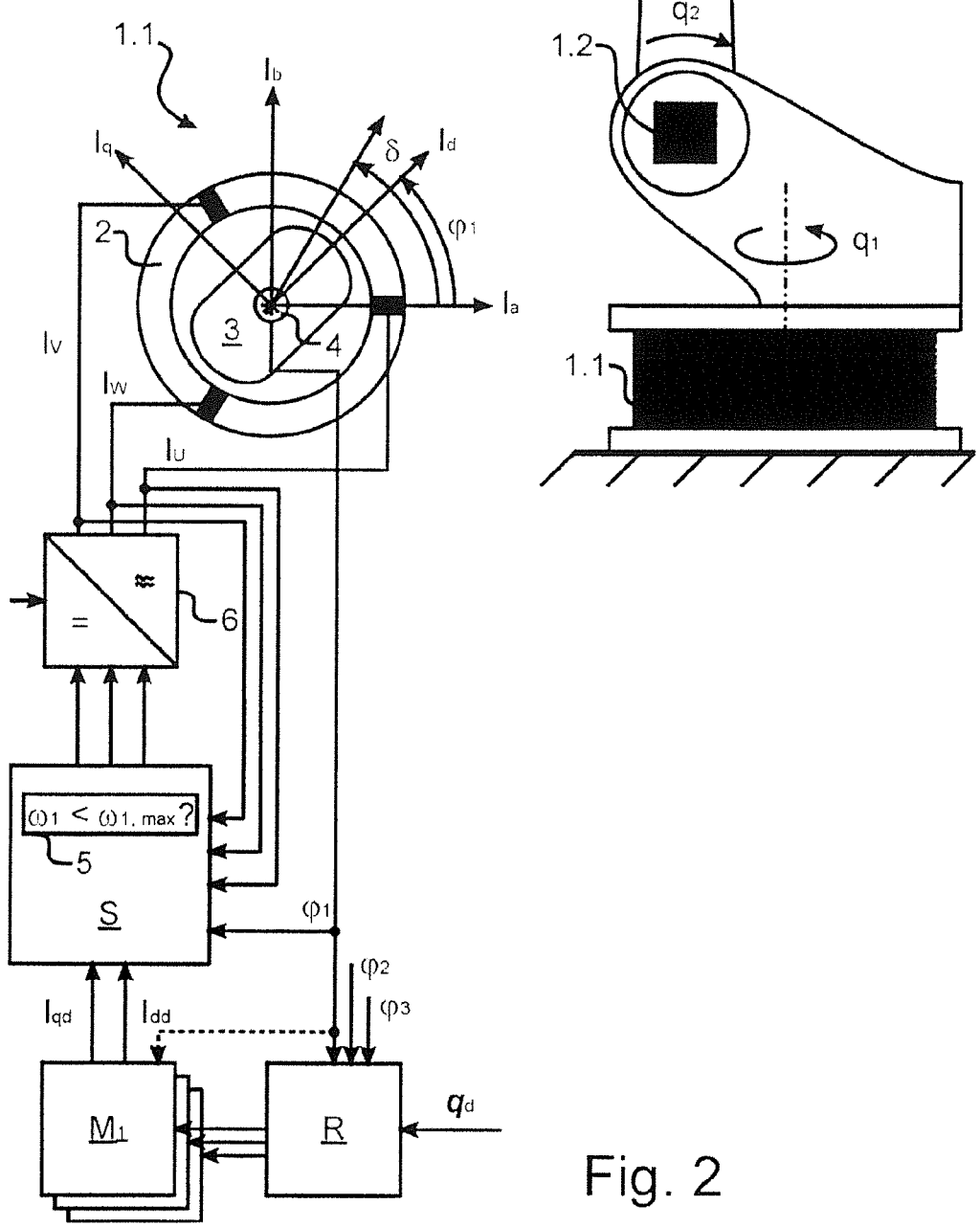
FIG. 2 shows a controller of the articulated arm robot with a device for monitoring according to an embodiment of the present invention.

FIG. 2 shows such a drive motor 1.1 with a stator 2 that has three windings with the currents $I_U$, $I_V$ and $I_W$ and a permanently magnetically activated rotor 3 whose rotor magnetic field orientation is described by the rotor angle $\phi_1$ relative to the stator 2. Rotor and axle angles $\phi$, q can be transformed between one another corresponding to a gear ratio, possibly model-based under consideration of the play of the gearing.

A robot controller R receives desired positions $q_d = (q_{1d}, \ldots, q_{6d})$—for example from a path planning, and also receives real drive positions $\phi_1, \phi_2, \ldots$, or real axle positions $q_1, q_2, \ldots$, for example by means of Hall sensors, encoders or resolvers 4 or without sensors by evaluating the induction in respective currentless stator windings of the drive motors. From these inputs, the controller R determines control variables (for example desired angle changes $\Delta\phi_{1d}, \Delta\phi_{2d}, \ldots$) of the individual drive motors and emits these as outputs to motor controllers M for the different drive motors 1.1, 1.2, . . . .

From these control signals, the motor controllers M determine a respective desired current feed $I_{qd}$, $I_{dd}$ for a constant, predetermined drive motor torque $T_d$ in a reference system rotating with the rotor 3, for example based on proportional-plus-integral control. For example, the robot controller R can similarly predetermine new desired angles $\phi_1, \phi_2, \ldots$ for the drive motors (for instance via corresponding reverse transformation of a predetermined Cartesian attitude and orientation of the TCP of the motor 10), and from this the motor controllers M in turn determine desired current feeds $I_{qd}$, $I_{dd}$ under consideration of the real drive positions $\phi_1, \phi_2, \ldots$, for example simplified according to $I_{qd} = P \times \Delta\phi_d$ with a proportionality factor P (see the dashed transfer of real drive positions $\phi_1$ in FIG. 2).

By means of a Clarke-Park transformation, a current controller S determines a desired current feed $I_{ad}$, $I_{bd}$ in a virtual stator-fixed reference system from the desired current feed $I_{qd}$, $I_{dd}$ in the reference system rotating with the rotor 3. In this virtual stator-fixed reference system, the stator magnetic field that is to be applied to realize the commanded position change according to motor controller M is rotated by a control commutation angle $\delta$ relative to a reference orientation that, for example, can be determined once in advance by means of "Wake & Shake".

Current and/or motor control can respectively be implemented wholly or partially in servo-electronics of the respective drive motor. The current and/or motor control can also be implemented at least partially together with the robot controller, for example in a control cabinet or a PC.

It is apparent that, according to the current controller regulation, the control commutation angle $\delta$ depends on the (presently constant) drive motor torque $T_d$, the commanded desired current feed $I_{qd}$, $I_{dd}$ in the reference system rotating with the rotor 3 and the real drive position $\phi_1$. For example, if the real drive position $\phi_1$ should be maintained, the commutation angle $\delta$ or the orientation of the rotating stator field, must also be maintained, with the strength or the amplitude of the currents $I_a$, $I_b$ determining the constant drive motor torque $T_d$.

A commutation angle limiter 5 according to the invention now compares whether a rate of change of the control commutation angle commanded by the motor controller M exceeds a predetermined limit value $\omega_{1,max}$ which, for example, was defined once according to $\omega_{1,max}=C\times d\phi_{1,max}/dt$ from a rotation angle velocity limit $d\phi_{1,max}/dt$ with a proportionality constant C that contains the reciprocal of the pole pair count of the drive motor 1.1.

If this is not the case, i.e. if a rate of change $d\phi_1/dt$ of the rotor 3 following the stator field rotating with $\omega_1$ does not exceed the limit value provided for this purpose, the control commutation angle is provided by the current controller as a commutation angle and realized in a pulse width-modulated manner in a convertor 6.

By contrast, if the commanded control commutation angle changes more quickly than is permitted by the limit value $\omega_{1,max}$ i.e. if the stator magnetic field were to rotate too quickly if the desired current feed $I_{qd}$, $I_{dd}$ were commanded by the motor controller, instead of this the commutation angle $\delta$ (for example) is provided as $$\delta=\phi_1-\delta_0,$$

namely shifted by a predetermined amount $\delta_0$ relative to the rotor angle. In this way the rotor 3 no longer continues to be accelerated if the drive motor 1.1 exceeds a velocity limit that is provided for it; rather, said rotor 3 is even braked by the rotating stator field driving in reverse.

It is apparent that, as long as the velocity limit in the current controller S is maintained, the drive motor torque $T_d$ is provided to set the commanded desired drive position, while upon exceeding the velocity limit a braking effect acts on the rotor 3 automatically and without delay via the cascading of robot controller, motor controller and current controller R, M or S.

Instead of the shift of the commutation angle relative to the real drive position $\phi_1$, a constant commutation angle $\delta$=const or a commutation angle $\delta(t+\Delta t)=\delta(t)+\omega_{1,max}\times\Delta t$ changing with the maximum permissible rate of change can also be provided, for example, in order to produce a pendulum drive moment $\pm T_d$.

Although a limit value for velocities was provided in the preceding exemplary embodiment, additional or alternatively limit values for accelerations of the rotor and/or commutation angle and/or for higher time derivatives can analogously be provided.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for monitoring operation of a movement-controlled manipulator in which movements of the manipulator are implemented by an electronically commutated drive motor having a stator comprising a stator winding arrangement that generates a commutated magnetic field, and a rotor that is caused to rotate by said commutated magnetic field interacting with a rotor field of said rotor, said commutated magnetic field exhibiting a commutation angle with respect to said rotor field, said method comprising the steps of:
   detecting a real position of said commutation angle in said drive motor;
   in servo-electronics, automatically generating a control signal that regulates said detected real position with respect to a control variable;
   in said servo-electronics, automatically determining a rate of change of said real position of said drive motor and, from said rate of change of said real position of said drive motor, automatically determining a rate of change of said commutation angle and generating said control signal to limit said rate of change of said commutation angle from exceeding a limit value; and
   supplying said control signal to said drive motor from said servo-electronics.

2. A method as claimed in claim 1 comprising generating said control signal to maintain said commutation angle at a constant value if said rate of change of said commutation angle exceeds said limit value.

3. A method as claimed in claim 1 comprising generating said control signal to shift said commutation angle by a predetermined amount relative to detected real drive motor position if said rate of change of said commutation angle exceeds said limit value.

4. A method as claimed in claim 1 comprising generating said control signal to set said commutation angle dependent on a real commutation angle and a maximum change value for said commutation angle if said rate of change of said commutation angle exceeds said limit value.

5. A method as claimed in claim 1 comprising generating said control signal to set said commutation angle to produce a constant drive force by said drive motor.

6. A method as claimed in claim 1 comprising detecting the real position of the drive motor with sensors associated with the drive motor.

7. A method as claimed in claim 1 comprising, with said control signal, operating said drive motor with commutation selected from the group consisting of block commutation, sine commutation and field commutation.

8. A method as claimed in claim 1 comprising, in said servo-electronics, determining said rate of change of real position of said drive motor as a time derivative.

9. A method as claimed in claim 8 comprising selecting said time derivative from the group consisting of velocity and acceleration.

10. A device for monitoring operation of a movement-controlled manipulator in which movements of the manipulator are implemented by an electronically commutated drive motor having a stator comprising a stator winding arrangement that generates a commutated magnetic field, and a rotor that is caused to rotate by said commutated magnetic field interacting with a rotor field of said rotor, said commutated magnetic field exhibiting a commutation angle with respect to said rotor field, said device comprising:
   a detector that detects a real position of said commutation angle in said drive motor;
   servo-electronics configured to automatically generate a control signal that regulates said detected real position with respect to a control variable;
   said servo-electronics being configured to automatically determine a rate of change of said real position of said drive motor and, from said rate of change of said real position of said drive motor, and to automatically determine a rate of change of said commutation angle and to generate said control signal to limit said rate of change of said commutation angle from exceeding a limit value; and
   said servo-electronics being configured to supply said control signal to said drive motor from said servo-electronics.

11. A device as claimed in claim 10 comprising a machine controller embodying said servo-electronics that provides a current to said stator winding arrangement dependent on said control signal.

12. A device as claimed in claim 10 comprising a converter supplied with said control signal that converts said control into a pulse width-modulated current in said stator winding arrangement.

13. A non-transitory, computer-readable storage medium encoded with programming instructions, said storage medium being loaded into servo-electronics that regulate an electrically commutated drive motor that implements movements in a movement-controlled device, said electrically commutated drive motor having a stator comprising a stator winding arrangement that generates a commutated magnetic field, and a rotor that is caused to rotate by said commutated magnetic field interacting with a rotor field of said rotor, said commutated magnetic field exhibiting a commutation angle with respect to said rotor field, said programming instructions causing said servo-electronics to:
- receive a signal representing a detected real position of said commutation angle in said drive motor;
- generate a control signal that regulates said detected real position with respect to a control variable;
- determine a rate of change of said real position of said drive motor and, from said rate of change of said real position of said drive motor, determine a rate of change of said commutation angle, and generate said control signal to limit said rate of change of said commutation angle from exceeding a limit value; and
- supply said control signal to said drive motor from said servo-electronics.

* * * * *